(12) United States Patent
Sengupta et al.

(10) Patent No.: US 12,519,764 B2
(45) Date of Patent: Jan. 6, 2026

(54) SYSTEMS AND METHODS FOR DEVICE CONNECTIVITY-BASED AUTHENTICATION

(71) Applicant: Wells Fargo Bank, N.A., San Francisco, CA (US)

(72) Inventors: Shuvam Sengupta, Kolkata (IN); Justin Christopher Blackburn, Litchfield Park, AZ (US); Ashutosh Verma, Bangalore (IN); Rameshchandra Bhaskar Ketharaju, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 282 days.

(21) Appl. No.: 18/334,158

(22) Filed: Jun. 13, 2023

(65) Prior Publication Data
US 2024/0422146 A1 Dec. 19, 2024

(51) Int. Cl.
*H04L 9/40* (2022.01)

(52) U.S. Cl.
CPC ........ *H04L 63/08* (2013.01); *H04L 2463/082* (2013.01)

(58) Field of Classification Search
CPC ...................................... H04L 63/08
USPC ............................................. 726/3
See application file for complete search history.

(56) References Cited

U.S. PATENT DOCUMENTS

| | | | | |
|---|---|---|---|---|
| 8,407,765 | B2* | 3/2013 | Wiley | H04L 41/0896 726/28 |
| 10,742,647 | B2 | 8/2020 | Crabtree et al. | |
| 2009/0254975 | A1* | 10/2009 | Turnbull | H04W 4/029 709/205 |
| 2013/0055346 | A1* | 2/2013 | Singh | H04L 63/08 726/3 |
| 2018/0225592 | A1* | 8/2018 | Ponnuswamy | G06N 20/00 |

(Continued)

OTHER PUBLICATIONS

Fegzhan, Aon Kondoro, Sead Muftc, Location-based Authentication and Authorization Using Smart Phones, School of Information and Communication Technology, Stockholm, Sweden.

(Continued)

*Primary Examiner* — Dant B Shaifer Harriman
(74) *Attorney, Agent, or Firm* — K&L Gates LLP

(57) ABSTRACT

Systems, apparatuses, methods, and computer program products are disclosed for device connectivity-based authentication. An example method includes receiving, from a first device, an authorization request associated with a first action. The example method also includes receiving a current connectivity dataset from the first device which indicates one or more devices detected by the first device to be in communication with the first device. The example method also includes comparing the current connectivity dataset with a reference connectivity dataset. The example method also includes determining, based on the comparison, whether the current connectivity dataset and the reference connectivity dataset satisfy a predefined similarity threshold. The example method also includes authorizing, in an instance in which the current connectivity dataset and the reference connectivity dataset satisfy the predefined similarity threshold, the first device to perform the first action.

20 Claims, 6 Drawing Sheets

(56) References Cited

U.S. PATENT DOCUMENTS

2025/0005383 A1* 1/2025 Sharpe .................. G06N 20/00
2025/0217334 A1* 7/2025 Khan .................... G06F 16/215

OTHER PUBLICATIONS

Markus Miettinen, Thien Duc Nguyen, Ahmad-Rez Sadeghi, N. Asokan, Revisiting Context-Based Authentication in IoT, Proceedings of the 55th Annual Design Automation Conference, Apr. 24, 2018.

* cited by examiner

SYSTEMS AND METHODS FOR DEVICE CONNECTIVITY-BASED AUTHENTICATION

BACKGROUND

With the increased proliferation of Internet-of-Things (IoT) devices made possible via cellular communication technologies, a greater volume of data may be made available and readily collected and utilized for a variety of purposes.

BRIEF SUMMARY

One result of the growth of IoT device deployment is the ability to provide Internet access to a variety of network-connected devices that have conventionally not been supported (e.g., smart devices). For example, smart devices may include smart appliances, such as washing machines, refrigerators, and ovens. Smart devices may also include smart locks, smart thermostats, smart lighting systems, and smart sensors, such as occupancy sensors, moisture sensors, and temperature sensors.

Moreover, advancements in cellular communication technologies have led to improvements in wireless networks and the way devices communicate with each other. For example, the evolution from Second Generation (2G) to Fifth Generation (5G) and soon Sixth Generation (6G) has brought a significant increase in available bandwidth, which has enabled devices to transfer a greater amount of data in real-time. Additionally, advanced generations of cellular networks have significantly reduced data transfer latency and improved device-to-device communication, allowing devices to communicate directly with each other without needing to go through a centralized network.

At the same time, the increasing frequency and sophistication of cyberattacks has brought about the need for enhanced security measures, such as multifactor authentication (MFA). MFA adds additional layers of security by requiring multiple authentication factors other than a password. For instance, typical implementations of MFA require a user to provide a fingerprint scan in addition to a username and password combination. While biometric scan authentication factors are generally considered to be safer than traditional password authentication, biometric scans can still be spoofed through cyberattacks. Additionally, conventional authentication factors which verify a location of a device often rely on static information which can be easily spoofed (e.g., static location coordinates).

A need therefore exists to enhance the security of MFA through use of additional authentication factors which are extremely difficult or impossible to spoof. Example embodiments described herein leverage the proliferation of computing devices (e.g., traditional computing devices and IoT devices as described above) and their communicative capabilities to produce a unique device connectivity-based location authentication process which, when combined with other authentication factors, greatly improves the protection against unauthorized access and data breaches that MFA provides.

Example embodiments leverage devices that are in communication with a client device as well as characteristics of both those devices and the connections between those devices and the client device to verify that the client device is indeed located at a particular location which the client device indicates itself to be. To this regard, example embodiments leverage the advancements of cellular communication technologies discussed above and the growth of IoT device deployment to obtain information from devices about other devices that are communicating or attempting to communicate information at various locations. In doing so, reference connectivity datasets may be generated and stored in connection with a vast amount of locations that indicate which devices are likely to be in communication with a given device at a particular location and also characteristics regarding how those devices should be communicating with the given device (e.g., expected communication characteristics such as latency, bandwidth, packet loss, etc.). In this regard, when a client device provides a current connectivity dataset indicating a location of the client device as well as information regarding devices currently in communication with the client device, a reference connectivity dataset for the specific location may be retrieved and compared with the current connectivity dataset to ensure information regarding those devices correspond accordingly.

Example embodiments also leverage information regarding proximal devices to establish an optimal communication path for a data transfer occurring subsequently to an authentication of a client device's location. In this regard, the disclosed system may advantageously utilize information from a current connectivity dataset to select at least a portion of devices as nodes in an optimal communication path without otherwise having to separately probe those devices for information regarding their connectivity status.

Accordingly, the present disclosure sets forth systems, methods, and apparatuses that provide device connectivity-based authentication. There are many advantages of these and other embodiments described herein. For instance, by utilizing information regarding proximal devices and their communication characteristics, example embodiments provide means for verifying a device's location that is much more difficult to spoof than traditional static information such as simple location coordinates. Moreover, example embodiments avoid wasting networking and computing resources when attempting to determine an optimal communication path, e.g., in the form of additional probes transmitted to various devices, by utilizing information regarding those devices provided by way of a current connectivity dataset.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
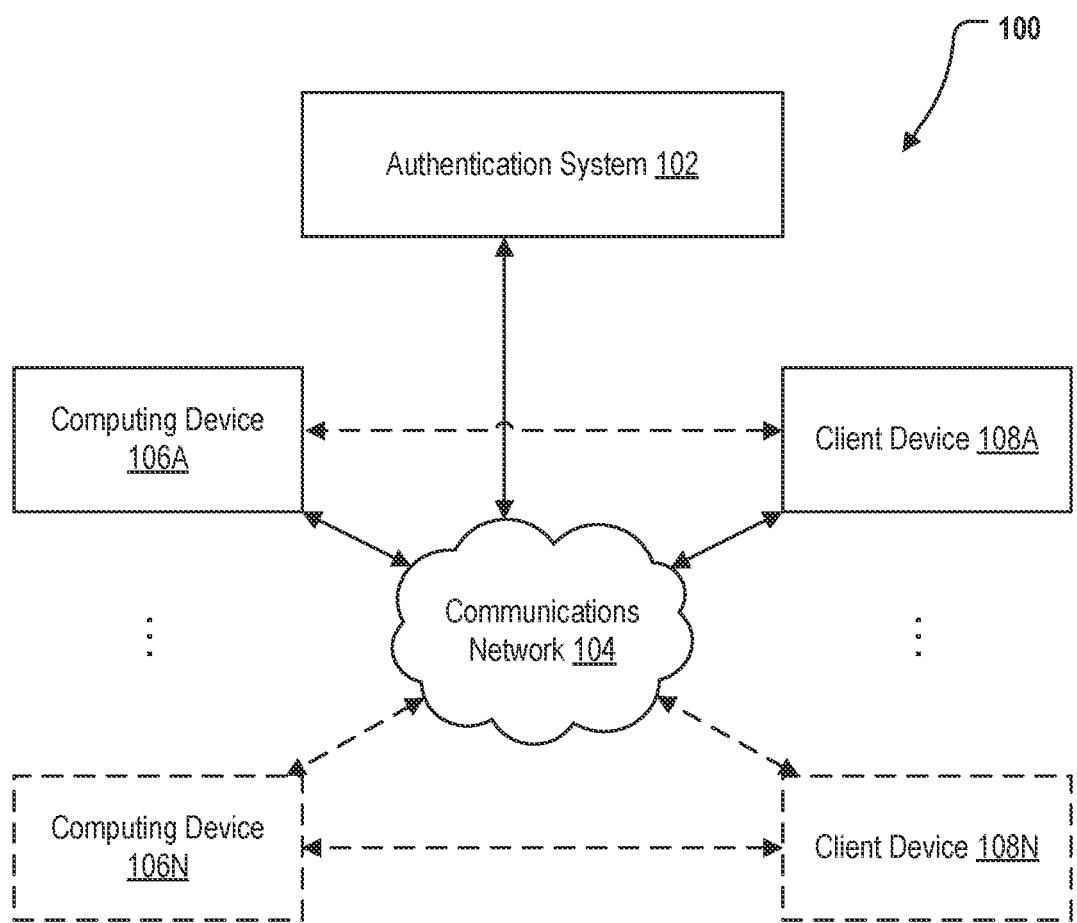
FIG. 1 illustrates a system in which some example embodiments may be used for device connectivity-based authentication.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The terms "computing device" or "device" refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), modems, routers, other edge devices, and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" refers to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "current connectivity dataset" refers to a data structure that that indicates one or more devices (and characteristics of those devices) that are detected by a particular device to be in communication with the particular device (for example, at a current location of the particular device and at a current time). In some embodiments, the particular device may be in communication with a first device of the one or more devices such that the particular device is electronically communicating back and forth with the first device. For example, a wired or wireless connection may exist between the particular device and the first device such that the devices are transmitting information to each other via the wired or wireless connection. In some embodiments, the communication with the particular device may be one-way. For instance, the particular device may receive communication (e.g., a signal) from the first device, however, may not communicate any information back to the first device. As an example, the particular device (e.g., a laptop in a first home) may detect a signal from a first device (e.g., a router broadcasting a Wi-Fi network in a second home), yet not transmit any data to the first device in response. Even though no response is communicated, the current connectivity dataset may still include an indication of the first device as being detected by the particular device to be in communication with the particular device.

A current connectivity dataset is capable of being electronically transmitted between devices. For example, a current connectivity dataset may be transmitted from a client device (e.g., a client device 108A, as described below in connection with FIG. 1) to a server, such as authentication system 102. In some embodiments, a current connectivity dataset may be transmitted from a device to a server (e.g., authentication system 102) in response to an electronic request (e.g., a current connectivity dataset request) transmitted to the device from the server. In some embodiments, a current connectivity dataset may be automatically generated (by a device) and transmitted to a server periodically (e.g., without the device needing to receive a current connectivity dataset request from the server). A current connectivity dataset may include an indication of a current location of the device that generates the current connectivity dataset. In some embodiments, the current location of the device may be indicated by location coordinates (e.g., Global Positioning System (GPS) coordinates obtained from a GPS receiver of the device) and/or similar data which may identify a location of the device.

A "reference connectivity dataset" refers to a data structure that that indicates one or more devices (and characteristics of those devices) that are likely to be detected, by a particular device, to be in communication with the particular device when the particular device is located at or within a predefined proximity to a particular location (and, in some embodiments, at a particular time). A reference connectivity dataset may be generated based on a plurality of current connectivity datasets that are received by various devices over time (as further discussed below in connection with FIG. 4). A reference connectivity dataset may be associated with a particular location (e.g., particular GPS coordinates) and, in some embodiments, with a predefined proximity to the particular location. In this regard, for a current connectivity dataset received by a device at a first location, a reference connectivity dataset may be identified that corresponds to the first location (e.g., as either matching the first location or falling within the predefined proximity to the first location). In various embodiments, an authentication system may store a plurality of reference connectivity datasets for a plurality of locations.

System Architecture

Example embodiments described herein may be implemented using any of a variety of computing devices or servers. To this end, FIG. 1 illustrates an example environment 100 within which various embodiments may operate. As illustrated, an authentication system 102 may receive and/or transmit information via communications network 104 (e.g., the Internet) with any number of other devices, such as one or more of computing devices 106A-106N and/or client devices 108A-108N. As shown in FIG. 1, one or more computing devices 106A-106N may also receive and/or transmit information with one or more client devices 108A-108N separate from the communications network 104, for example, through a wired connection or through a wireless connection, such as a Bluetooth connection or the like.

The authentication system 102 may be implemented as one or more computing devices or servers, which may be composed of a series of components. Particular components of the authentication system 102 are described in greater detail below with reference to apparatus 200 in connection with FIG. 2.

The one or more computing devices 106A-106N and the one or more client devices 108A-108N may be embodied by any computing devices known in the art. The one or more computing devices 106A-106N and the one or more client devices 108A-108N need not themselves be independent devices, but may be peripheral devices communicatively coupled to other computing devices.

Example Implementing Apparatuses

Figure 2:
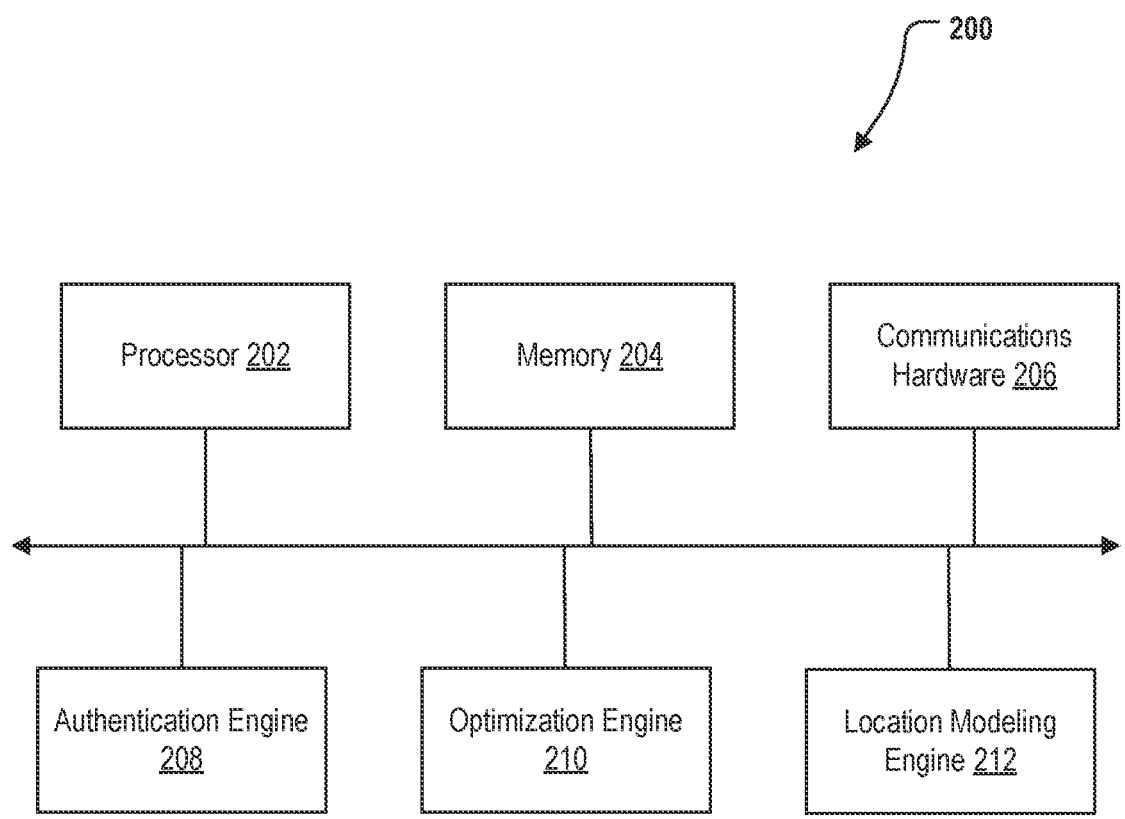
FIG. 2 illustrates a schematic block diagram of example circuitry embodying a system device that may perform various operations in accordance with some example embodiments described herein.

The authentication system 102 (described previously with reference to FIG. 1) may be embodied by one or more computing devices or servers, shown as apparatus 200 in FIG. 2. The apparatus 200 may be configured to execute various operations described above in connection with FIG. 1 and below in connection with FIGS. 3-6. As illustrated in FIG. 2, the apparatus 200 may include processor 202, memory 204, communications hardware 206, an authentication engine 208, an optimization engine 210, and a location modeling engine 212, each of which will be described in greater detail below.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor. In some cases, the processor may be configured to execute hard-coded functionality. As such, whether configured by hardware or software methods, or by a combination of hardware with software, the processor 202 represent an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

Memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein. For example, in some embodiments, the memory 204 may store a plurality of reference connectivity datasets.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may further be configured to provide output to a user and, in some embodiments, to receive an indication of user input. In this regard, the communications hardware 206 may comprise a user interface, such as a display, and may further comprise the components that govern use of the user interface, such as a web browser, mobile application, dedicated client device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an authentication engine 208 that compares a current connectivity dataset with a reference connectivity dataset, determines, based on the comparison, whether the current connectivity dataset and the reference connectivity dataset satisfy a predefined similarity threshold, and, based on the determination, authorizes or prevents performance of an action by a device associated with the current connectivity dataset. The authentication engine 208 may also select a reference connectivity dataset from a plurality of reference connectivity datasets based on a current location of a device, as well as verify one or more ancillary authorization factors. The authentication engine 208 may utilize processor 202, memory 204, or any other hardware component included in the apparatus 200 to perform these operations, as described in connection with FIGS. 3 and 5 below. The authentication engine 208 may further utilize communications hardware 206 to gather data from a variety of sources (e.g., computing devices 106A-106N, client devices 108A-108N, and/or memory 204, as shown in FIG. 1), and/or exchange data with a user, and in some embodiments may utilize processor 202 and/or memory 204 to perform the operations noted above and various other operations as described herein.

In addition, the apparatus 200 further comprises an optimization engine 210 that selects, based on a current connectivity dataset, at least one device from the one or more devices detected by a first device in order to facilitate a data transfer between the first device and a second device via the at least one device. The optimization engine 210 may utilize processor 202, memory 204, or any other hardware component included in the apparatus 200 to perform these operations, as described in connection with FIG. 6 below. The optimization engine 210 may further utilize communications hardware 206 to gather data from a variety of sources (e.g., computing devices 106A-106N and/or client devices 108A-108N, as shown in FIG. 1), and/or exchange data with a user, and in some embodiments may utilize processor 202 and/or memory 204 to determine an optimal transmission path between a first device and a second device that includes one or more devices identified in a current connectivity dataset associated with the first device.

Further, the apparatus 200 further comprises a location modeling engine 212 that generates reference connectivity datasets associated with respective locations. The location modeling engine 212 may utilize processor 202, memory 204, or any other hardware component included in the apparatus 200 to perform these operations, as described in connection with FIGS. 3 and 4 below. The location modeling engine 212 may further utilize communications hardware 206 to gather data from a variety of sources (e.g., current connectivity datasets received from client devices 108A-108N, as shown in FIG. 1), and/or exchange data with a user, and in some embodiments may utilize processor 202 and/or memory 204 to generate reference connectivity datasets.

Although components 202-212 are described in part using functional language, it will be understood that the particular implementations necessarily include the use of particular hardware. It should also be understood that certain of these components 202-212 may include similar or common hardware. For example, the authentication engine 208, the optimization engine 210, and the location modeling engine 212 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the terms "circuitry" and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 200 to perform the various functions described herein.

Although the authentication engine 208, the optimization engine 210, and the location modeling engine 212 may leverage processor 202, memory 204, or communications hardware 206 as described above, it will be understood that any of the authentication engine 208, the optimization engine 210, and the location modeling engine 212 may include one or more dedicated processor, specially configured field programmable gate array (FPGA), or application specific interface circuit (ASIC) to perform its corresponding functions, and may accordingly leverage processor 202 executing software stored in a memory (e.g., memory 204), or communications hardware 206 for enabling any functions not performed by special-purpose hardware. In all embodiments, however, it will be understood that the authentication engine 208, the optimization engine 210, and the location modeling engine 212 comprise particular machinery designed for performing the functions described herein in connection with such elements of apparatus 200.

In some embodiments, various components of the apparatus 200 may be hosted remotely (e.g., by one or more cloud servers) and thus need not physically reside on the corresponding apparatus 200. For instance, some components of the apparatus 200 may not be physically proximate to the other components of apparatus 200. Similarly, some or all of the functionality described herein may be provided by third party circuitry. For example, a given apparatus 200 may access one or more third party circuitries in place of local circuitries for performing certain functions.

As will be appreciated based on this disclosure, example embodiments contemplated herein may be implemented by apparatus 200. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, DVDs, flash memory, optical storage devices, and magnetic storage devices. It should be appreciated, with respect to certain devices embodied by apparatus 200 as described in FIG. 2, that loading the software instructions onto a computing device or apparatus produces a special-purpose machine comprising the means for implementing various functions described herein.

Having described specific components of example apparatus 200, example embodiments are described below in connection with a series of flowcharts.

Example Operations

Turning to FIGS. 3-6, example flowcharts are illustrated that contain example operations implemented by example embodiments described herein. The operations illustrated in FIGS. 3-6 may, for example, be performed by the authentication system 102 shown in FIG. 1, which may in turn be embodied by an apparatus 200, which is shown and described in connection with FIG. 2. To perform the operations described below, the apparatus 200 may utilize one or more of processor 202, memory 204, communications hardware 206, authentication engine 208, optimization engine 210, location modeling engine 212, and/or any combination thereof. It will be understood that user interaction with the authentication system 102 may be facilitated by a separate client device (e.g., client devices 108A-108N, as shown in FIG. 1), which may have similar or equivalent physical componentry facilitating such user interaction.

Figure 3:
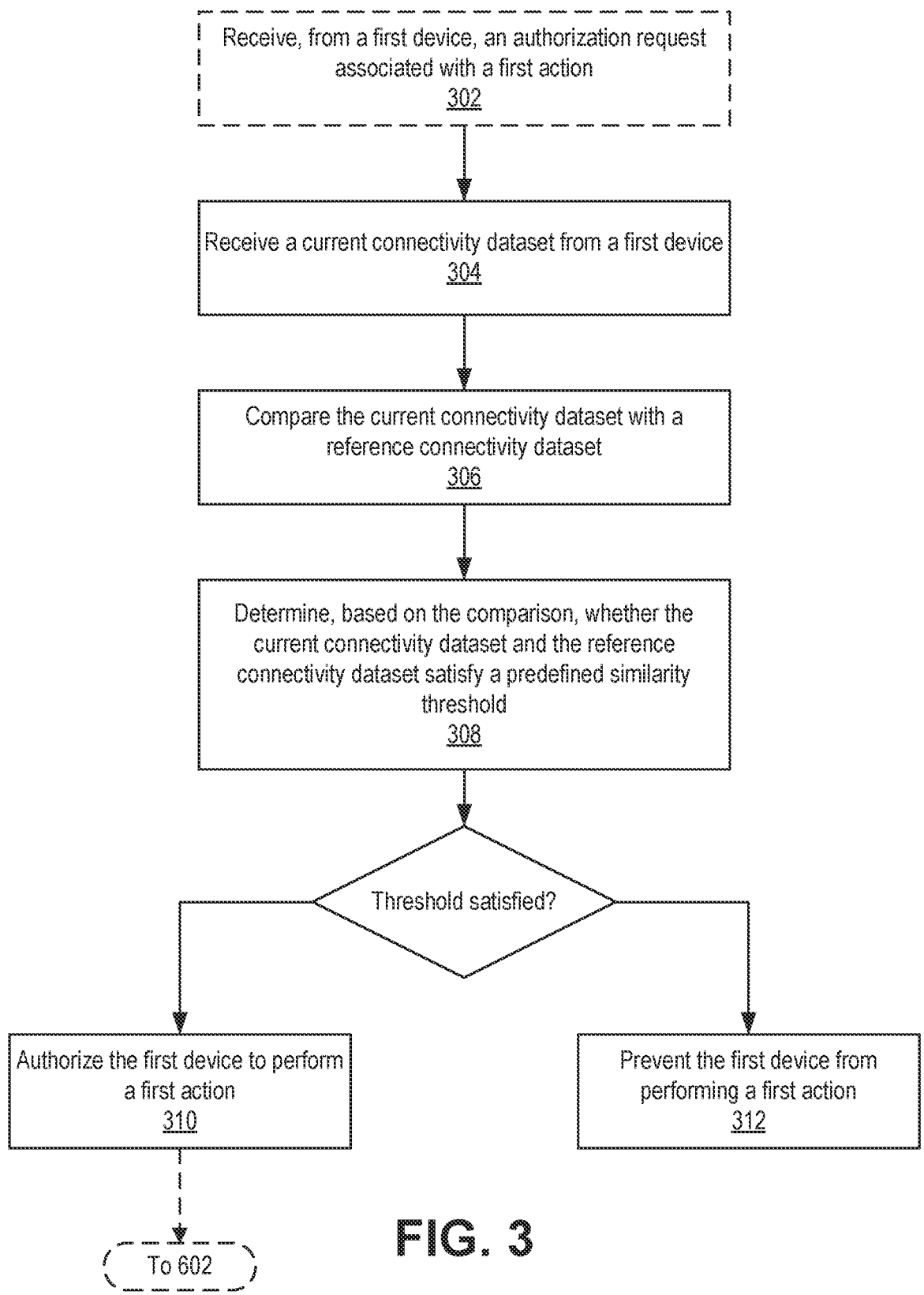
FIG. 3 illustrates an example flowchart for device connectivity-based authentication, in accordance with some example embodiments described herein.

Turning first to FIG. 3, example operations are shown for device connectivity-based authentication.

In some embodiments, authentication may be required in an instance in which a user wishes to perform some action via their client device (e.g., any of client devices 108A-108N). For instance, an action may comprise accessing a resource (e.g., a network, sensitive data, the client device itself, online services such as mobile banking applications or websites, or the like), conducting a transaction (e.g., making a purchase, transferring funds, etc.), and/or the like. In some embodiments, authentication may include multi-factor authentication (MFA) in which multiple authentication factors must be verified before the action can take place. In some embodiments, a client device may request authorization to perform an action. In this regard, a client device may transmit an authorization request to the authentication system 102 in order for the authentication system 102 to authorize performance of the action by the client device. As shown by operation 302, the apparatus 200 includes means, such as processor 202, memory 204, communications hardware 206, or the like, for receiving, from a first device, an authorization request associated with a first action. In some embodiments, operation 302 may be an optional step. In this regard, in addition to authorizing some action to be performed by a client device, there may be other instances in which authentication needs to occur. For instance, an authentication system 102 may periodically authenticate a client device automatically. In this regard, the authentication system 102 may perform a re-challenge authentication procedure for an authenticated session with a client device, wherein certain authentication factors are resubmitted and verified again at regular intervals to ensure authenticity of the device and/or a user operating the device.

As noted above, a location of the client device may be one authentication factor which can be verified. Typically, some static information regarding the device's location is provided for authentication. For instance, GPS coordinates of the device's location may be provided. However, this static information can be easily spoofed. For instance, a device's location may be spoofed to a server by using a virtual private network (VPN) to hide the device's true Internet Protocol (IP) address and location. By connecting to a VPN server located in a different region, the device can make it appear as though it is located in that particular region. In other cases, location-spoofing apps may be used to simulate GPS signals or provide false location data to other applications on the device. Additionally, a device may send data through a proxy server, making it appear as though the data is coming from a location of the proxy server. To solve this issue, example embodiments may verify a location of the device using a current connectivity dataset.

In some embodiments, the authentication system 102 may request that the client device provide a current connectivity dataset. In this regard, the apparatus 200 includes means, such as processor 202, memory 204, communications hardware 206, or the like, for causing transmission of a current connectivity dataset request to a first device. In response to the current connectivity dataset request, a client device may generate a current connectivity dataset and cause transmission of a current connectivity dataset to the authentication system 102.

As described above, a current connectivity dataset indicates one or more devices (and characteristics of those devices) that are detected by a particular device to be in communication with the particular device, for example, at a current location of the particular device and at a current time. In this regard, the current connectivity dataset also includes indications of a current location of the client device (e.g., GPS coordinates) and a current timestamp at which the current connectivity dataset was generated. The client device may generate a current connectivity dataset such that the current connectivity dataset includes indications of devices that are in communication with the client device at the current time.

The current connectivity dataset may include one or more device identifying characteristics for each device that is in communication with the client device. In some embodiments, device identifying characteristics may comprise one or more of an internet protocol (IP) address, a Media Access Control (MAC) address, a network name, and a device type. It is to be appreciated that other characteristics by which a device may be identified may also be included in the current connectivity dataset.

The current connectivity dataset may include one or more communication characteristics for each device that is in communication with the client device. In some embodiments, communication characteristics may indicate details regarding a connection to another device. For instance, communications characteristics may comprise one or more indications of packet loss, connection type, bandwidth, latency, jitter, and security.

A packet loss communication characteristic may indicate a rate (over a period of time) at which data packets communicated over a connection between the client device and another device (e.g., any one of computing devices 106A-106N) are lost or otherwise fail to arrive at a destination. A connection type communication characteristic may indicate a type of connection between the client device and another device (e.g., any one of computing devices 106A-106N). For instance, a connection type communication characteristics may indicate that the connection is a hardwired ethernet connection, a wireless Wi-Fi connection, or the like. A bandwidth communication characteristic may indicate an amount of data that can be transmitted over a connection between the client device and another device (e.g., any one of computing devices 106A-106N). The bandwidth communication characteristic may indicate the amount of data, e.g., in bits per second (bps), megabits per second (Mbps), kilobits per second (kbps), or the like. A latency communication characteristic may indicate an amount of time it takes for data to travel between the client device and another device (e.g., any one of computing devices 106A-106N) over a connection between the devices. The latency communication characteristic may indicate this amount of time in milliseconds (ms) or the like. The jitter communication characteristic may indicate a variation of latency over time. The security communication characteristic may indicate type(s) of security mechanisms utilized for a connection between the client device and another device (e.g., any one of computing devices 106A-106N). For example, the security communication characteristic may indicate whether the connection is a Secure Sockets Layer (SSL) connection, Transport Layer Security (TLS) connection, or other secure connection.

As shown by operation 304, the apparatus 200 includes means, such as processor 202, memory 204, communications hardware 206, or the like, for receiving a current connectivity dataset from a first device. The current connectivity dataset may be received in response to a current connectivity dataset request as noted above. Alternatively, in some embodiments, the current connectivity dataset may be received from the client device automatically and on a periodic basis.

As shown by operation 306, the apparatus 200 includes means, such as processor 202, memory 204, authentication engine 208, or the like, for comparing the current connectivity set with a reference connectivity set. As described above, a reference connectivity set that indicates one or more devices (and characteristics of those devices) that are likely to be detected, by a particular device, to be in communication with the particular device when the particular device is located at or within a predefined proximity to a particular location. As discussed further below, the authentication engine 208 may compare characteristics of the one or more devices indicated in a current connectivity dataset with characteristics of the one or more devices indicated in a reference connectivity dataset. A reference connectivity dataset may be stored by the authentication system 102 and retrieved in order to compare the reference connectivity dataset with a current connectivity dataset received by a client device.

The authentication system 102 may store a plurality of reference connectivity datasets for different locations, and select a reference connectivity dataset from the stored plurality of reference connectivity datasets based, e.g., on a current location of the client device indicated by the current connectivity dataset. In this regard, the apparatus 200 includes means, such as processor 202, memory 204, authentication engine 208, or the like, for selecting a reference connectivity dataset from a plurality of reference connectivity datasets based at least on the current location of the first device. For instance, based on a current location of a client device indicated in a current connectivity dataset received from the client device, the authentication system 102 may select a reference connectivity dataset associated with a location that matches or otherwise corresponds to (e.g., is within a predefined proximity to) the current location of the client device.

In some embodiments, a reference connectivity dataset may be selected not only based on a current location of the client device but also a current time indicated by the current connectivity dataset. For instance, multiple reference connectivity datasets may be stored in connection with a particular location based on a time of day, time of month, time of year, etc. As one example, certain devices may be actively communicating at a certain location during particular hours of the day (e.g., an employer-provided laptop may be actively communicating between the hours of 9:00 AM and 5:00 PM) and not communicating at other hours of the day (e.g., the employer-provided laptop may be powered down after 5:00 PM).

Figure 4:
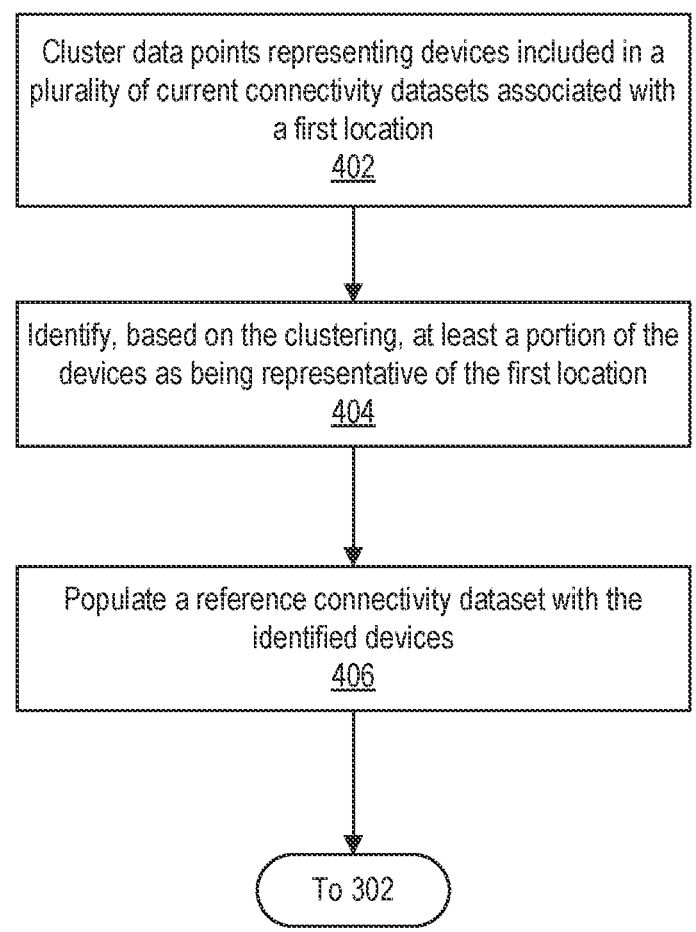
FIG. 4 illustrates an example flowchart for generating a reference connectivity dataset, in accordance with some example embodiments described herein.

Turning briefly to FIG. 4, example operations are shown for generating a reference connectivity dataset. In some embodiments, the authentication system 102 may generate reference connectivity datasets continuously for various locations based on current connectivity datasets received (e.g., from various client devices 108A-108N) that are associated with those locations (i.e., from client devices that were located at those locations). While some current connectivity datasets that are received by the authentication system 102 may be received in connection with an authentication procedure, current connectivity datasets may also be received without connection to authentication procedures; rather, current connectivity datasets may be collected in order to establish reference connectivity datasets for numerous locations. For example, in some embodiments, current connectivity datasets may be automatically collected and/or client devices may opt-in to providing current connectivity datasets to the authentication system 102.

As noted above, a reference connectivity dataset may be generated (e.g., by the authentication system 102) based on a plurality of current connectivity datasets received during a plurality of instances by respective devices of a plurality of devices at a first location. In this regard, for a plurality of current connectivity datasets received from a plurality of client devices at a first location, the authentication system 102 may identify (i) the devices indicated in the current connectivity datasets (e.g., devices that were in communication with a respective client device at that location) and (ii) characteristics of those devices (e.g., device identifying characteristics and communication characteristics).

To identify devices likely to communicate with other devices (e.g., client devices) at a particular location, the authentication system 102 may cluster data points representing those devices to identify how often they appear in current connectivity datasets. In this regard, as shown by operation 402, the apparatus 200 includes means, such as processor 202, memory 204, location modeling engine 212, or the like, for clustering data points representing devices included in a plurality of current connectivity datasets. The devices included in the plurality of current connectivity datasets are devices that are detected (by client devices supplying the current connectivity datasets) to be in communication with the devices at the particular location.

As one example, a client device (e.g., a mobile phone) located in a user's home may generate and transmit current connectivity datasets to the authentication system 102 over a period of time (e.g., once a day). These current connectivity datasets may indicate certain devices that are always (or most of the time) in communication with the client device when the client device is present in the user's home (e.g., a Bluetooth connection to a particular smartwatch, a Wi-Fi connection to the user's router, as well as several indications of routers broadcasting respective Wi-Fi networks at neighboring homes). As another example, multiple client devices (e.g., mobile phones) may generate and transmit current connectivity datasets when located in a particular retail establishment. These current connectivity datasets may indicate certain devices that are in communication with the client device when the client device is present in the retail establishment. For instance, a client device may receive a signal from a router broadcasting a Wi-Fi network for the retail establishment, and may receive signals from other client devices (e.g., mobile phones of other customers within the store).

As shown by operation 404, the apparatus 200 includes means, such as processor 202, memory 204, location modeling engine 212, or the like, for identifying, based on the clustering, at least a portion of the devices as being representative of the first location.

The authentication system 102 may identify devices as being representative of the first location based on the clustering of the devices. In other words, once data points have been clustered, the resulting groups are analyzed to identify patterns and gain insights into device behavior for a particular location. For example, the analysis may reveal certain devices that tend to be in the particular location at specific times. In this regard, outliers (e.g., data points outside of clusters) may also be readily identified and ignored. For instance, returning to the example above regarding a user's home, an outlier data point may represent a device belonging to a friend of the user who once visited the user's home and was once in communications with the user's client device. This device may have been included in one current connectivity dataset that the user's client device provided to the authentication system 102, but was not present again in any other current connectivity datasets transmitted to the authentication system by the client device. Accordingly, this data point would not be identified as being representative of that location (e.g., the user's home), whereas other data points that are more commonly included in current connectivity datasets (e.g., the user's router, neighboring Wi-Fi networks, etc.) would be identified as being representative of that location.

As shown by operation 406, the apparatus 200 includes means, such as processor 202, memory 204, location modeling engine 212, or the like, for populating the reference connectivity dataset with the identified devices. In this regard, the authentication system 102 may generate a reference connectivity dataset that includes indications of devices commonly found to be in communication with client devices when those client devices are located at a particular location. Additionally, the reference connectivity dataset may also include characteristics which are likely to be exhibited by those devices at that location. For instance, using a plurality of received current connectivity datasets for a particular location, the authentication system 102 may determine an average or range of certain characteristics (e.g., bandwidth, latency, and/or other communication characteristics) and include indications of those averages or ranges in the reference connectivity dataset. For example, a reference connectivity data set may indicate that, when at a particular location, a client device connected to a Wi-Fi network via a particular router should experience a bandwidth between 50 Mbps and 100 Mbps (based on a range of bandwidth information received in the plurality of current connectivity datasets).

Returning to FIG. 3, at operation 308, the apparatus 200 includes means, such as processor 202, memory 204, authentication engine 208, or the like, for determining, based on the comparison, whether the current connectivity dataset and the reference connectivity dataset satisfy a predefined similarity threshold. For example, the predefined similarity threshold may require that devices in the current connectivity dataset include all of the devices included in the reference connectivity dataset. In some embodiments, the predefined similarity threshold may require that at least a predefined portion of devices in the reference connectivity dataset be included in the current connectivity dataset. In some embodiments, the predefined similarity threshold may also require that all or certain communication characteristics indicated in the current connectivity dataset match or correspond to communication characteristics indicated by the reference connectivity dataset. For instance, continuing with the example above, a current connectivity dataset indicating a bandwidth of 5 Mbps may be determined to not satisfy the predefined similarity threshold when the reference connectivity dataset indicates a bandwidth of between 50 and 100 Mbps should be experienced by that particular connection.

As shown in FIG. 3, in an instance in which the current connectivity dataset and the reference connectivity dataset satisfy the predefined similarity threshold, the method may continue to operation 310, wherein the apparatus 200 includes means, such as processor 202, memory 204, authentication engine 208, or the like, for the first device to perform the first action. In this regard, the action indicated in the original authorization request (as discussed above in connection with operation 302) may be authorized in that the authentication system 102 allows the device to perform the action.

In some embodiments, in an instance in which the current connectivity dataset and the reference connectivity dataset fail to satisfy the predefined similarity threshold, the method may continue to operation 312, wherein the apparatus 200 includes means, such as processor 202, memory 204, authentication engine 208, or the like, for preventing the first device from performing the first action. In this regard, the authentication system 102 may prevent the device from performing the action indicated in the original authorization request (as discussed above in connection with operation 302).

Figure 5:
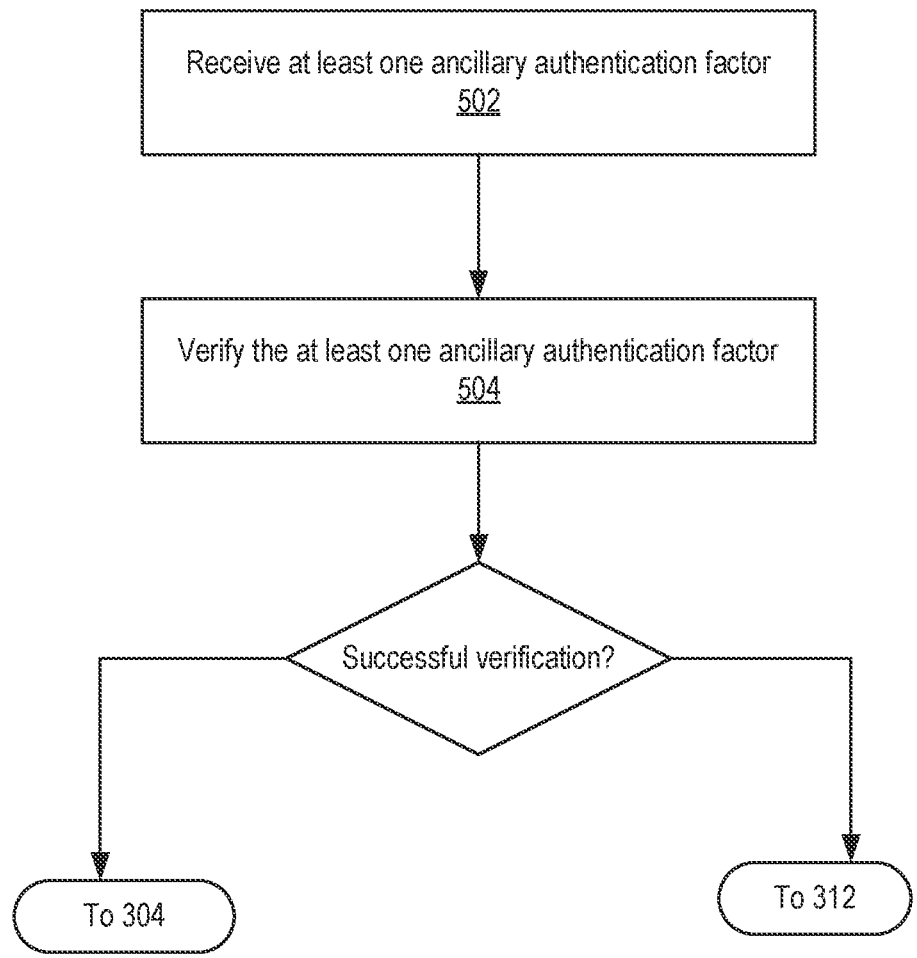
FIG. 5 illustrates an example flowchart for verifying one or more ancillary authentication factors, in accordance with some example embodiments described herein.

In some embodiments, in addition to verifying that the current connectivity dataset and a reference connectivity dataset satisfy a predefined similarity threshold, the authentication system 102 may verify one or more additional ancillary authentication factors. For instance, in addition to verifying the location of the client device (e.g., based on devices communicating to the client device as indicated by a current connectivity dataset), the authentication system 102 may verify additional ancillary authentication factors, such as, for example, biometric scan factors, passwords, and/or other authentication factors. Turning to FIG. 5, example operations are shown for verifying one or more ancillary authentication factors.

As shown by operation 502, the apparatus 200 includes means, such as processor 202, memory 204, communications hardware 206, or the like, for receiving at least one ancillary authentication factor. The at least one ancillary authentication factor may be received prior to or in connection with receiving a current connectivity dataset. For example, in some embodiments, at least one ancillary authentication factor may be included as part of an authorization request (e.g., as described above in connection with operation 302). In this regard, a user may provide an ancillary authentication factor (e.g., a biometric scan factor, such as a fingerprint) via their client device when attempting to perform some action that requires authorization. In this example, the authentication system 102 may first verify the at least one ancillary authentication factor prior to requesting a current connectivity dataset from the client device. By doing so, the authentication system 102 may preserve network and computing resources, e.g., by preventing unnecessary data transmission of a current connectivity dataset in the event that the at least one ancillary authentication factor is unable to be successfully verified). In other words, if the user is unable to be authenticated in the first place, there is no need for an extra transmission of a current connectivity dataset.

As shown by operation 504, the apparatus 200 includes means, such as processor 202, memory 204, authentication engine 208, and/or the like, for verifying the at least one ancillary authentication factor.

In some embodiments, verification of the at least one ancillary authentication factor may involve comparing the ancillary authentication factor with a stored credential associated with the client device. For example, the authentication system 102 may verify that the ancillary authentication factor (e.g., a password) submitted (e.g., with the authorization request) matches a stored credential associated with the client device (or a user of the client device).

In some embodiments, such as instances in which the ancillary authentication factor comprises a biometric scan factor (e.g., a fingerprint), the authentication system 102 may confirm that the submitted ancillary authentication factor shares enough similarities to a previously stored biometric marker to satisfy a predefined similarity threshold. For example, the authentication engine 208 may preprocess the submitted biometric scan factor (e.g., to remove noise, inconsistencies, or the like) and compare the preprocessed biometric scan factor to the stored biometric marker using a matching algorithm, such as minutiae-based matching or pattern matching. A resulting match score may then be compared with a predefined similarity threshold. In some embodiments, if the match score exceeds the predefined similarity threshold, the ancillary authentication factor may be successfully verified.

As shown in FIG. 5, in some embodiments, in an instance in which the ancillary authentication factor is successfully verified, the method may continue to operation 304 of FIG. 3, wherein, as described above, the authentication system 102 may receive a current connectivity dataset through which a location of the client device will be verified as a subsequent step in a MFA process. In some embodiments, in an instance in which the ancillary authentication factor is unable to be successfully verified, the method may continue to operation 312, wherein, as described above, the authentication system 102 may prevent the client device from performing the first action.

Figure 6:
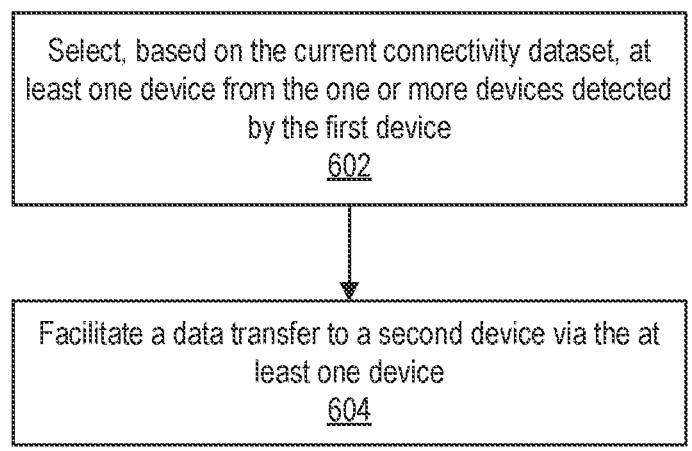
FIG. 6 illustrates an example flowchart for determining an optimal communication path based on a current connectivity dataset, in accordance with some example embodiments described herein.

In some embodiments, in an instance in which the location of the device is verified (along with any ancillary authentication factors), the authentication system 102 may then leverage information gained from the current connectivity dataset to determine an optimal communication path for communication between the client device and another device (e.g., a device related to the first action). An optimal communication path includes a plurality of nodes or devices through which data can be transmitted efficiently and with minimal packet loss or delay. As an example, the first action may comprise a transaction in which the client device is to transmit payment information to a payment server. In this regard, the authentication system 102 may leverage known characteristics regarding devices in proximity to the user to more efficiently determine an optimal communication path for delivery of the payment information from the client device to the payment server. Turning to FIG. 6, example operations are shown for determining an optimal communication path based on a current connectivity dataset.

As shown by operation 602, the apparatus 200 includes means, such as processor 202, memory 204, optimization engine 210, or the like, for selecting, based on the current connectivity dataset, at least one device from the one or more devices detected by the first device. The at least one device may be selected as a node in an optimal communication path. For example, the authentication system 102 may utilize a routing algorithm to determine a most efficient path based on a variety of factors, such as, for example, bandwidth, latency, packet loss, and/or other communication characteristics. Typically, a system would need to collect information about the network, including available devices, and the characteristics of the links between them by periodically sending probes to each device to measure available communication characteristics. However, by leveraging a current connectivity dataset, the authentication system 102 can avoid additional data transmissions (e.g., probes) to the devices included in the current connectivity dataset in that the information regarding those devices is already provided by way of the current connectivity dataset.

Once information is gathered regarding the network, the authentication system 102 may utilize a routing algorithm to determine an optimal path, which may include selecting one or more of the devices indicated in the current connectivity dataset as nodes through which information may pass from the client device to its destination (e.g., a payment server). As shown by operation 604, the apparatus 200 includes means, such as processor 202, memory 204, communications hardware 206, or the like, for facilitating a data transfer to a second device via the at least one device. For example, the authentication system 102 may communicate the optimal path to the client device, e.g., by transmitting a message that includes the IP addresses of each device in the optimal path along with other relevant information needed to transmit data to its destination. The client device, upon receiving the optimal communication path from the authentication system 102, may then begin transmitting data using the optimal communication path.

FIGS. 3, 4, 5, and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be implemented by execution of software instructions. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a non-transitory computer-readable memory that may direct a computing device or other programmable apparatus to function in a particular manner, such that the software instructions stored in the computer-readable memory comprise an article of manufacture, the execution of which implements the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

CONCLUSION

As described above, example embodiments provide methods and apparatuses that enable device connectivity-based authentication. Example embodiments thus provide tools that overcome the problems faced when utilizing location factors in existing multifactor authentication processes. For instance, by utilizing proximal devices and characteristics of their connectivity and communication with a given device rather than simple static location information, a more accurate understanding of the given device's location is obtained. Moreover, embodiments described herein avoid wasting networking and computing resources when attempting to determine an optimal communication path, e.g., in the form of additional probes transmitted to various devices, by utilizing information regarding those devices provided by way of a current connectivity dataset.

As these examples all illustrate, example embodiments contemplated herein provide technical solutions that solve real-world problems faced when attempting to authenticate a device based on location. The spoofing of authentication factors has been an ongoing issue, and the expanding amount of different ways to exploit MFA has made this problem significantly more acute. In turn, the demand for more secure MFA solutions has grown significantly. At the same time, the recent advancements in cellular communication technologies has unlocked new avenues to solving this problem that historically were not available, and example embodiments described herein thus represent a technical solution to these real-world problems.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
prior to receiving a current connectivity dataset from a first device, generating, by a location modeling engine, a reference connectivity dataset based on a plurality of current connectivity datasets received during a plurality of instances by respective devices of a plurality of devices at a first location, wherein generating the reference connectivity dataset comprises:

clustering, by the location modeling engine, data points representing devices included in the plurality of current connectivity datasets, wherein the devices included in the plurality of current connectivity datasets are devices that are detected by the devices of a plurality of devices to be in communication with the devices at the first location, identifying, by the location modeling engine and based on the clustering, at least a portion of the devices as being representative of the first location, and populating, by the location modeling engine, the reference connectivity dataset with the identified devices:

receiving, by communications hardware and from the first device, an authorization request associated with a first action;

receiving, by the communications hardware, the current connectivity dataset from the first device, wherein the current connectivity dataset indicates one or more devices detected by the first device to be in communication with the first device;

comparing, by an authentication engine, the current connectivity dataset with the reference connectivity dataset;

determining, by the authentication engine and based on the comparison, whether the current connectivity dataset and the reference connectivity dataset satisfy a predefined similarity threshold; and in an instance in which the current connectivity dataset and the reference connectivity dataset satisfy the predefined similarity threshold:

authorizing, by the authentication engine, the first device to perform the first action.

2. The method of claim 1, further comprising:
in an instance in which the current connectivity dataset and the reference connectivity dataset fail to satisfy the predefined similarity threshold:
preventing, by the authentication engine, the first device from performing the first action.

3. The method of claim 1, wherein the current connectivity dataset further indicates a current location of the first device, and wherein the method further comprises:
selecting, by the authentication engine, the reference connectivity dataset from a plurality of reference connectivity datasets based at least on the current location of the first device.

4. The method of claim 1, further comprising:
receiving, by the communications hardware, at least one ancillary authorization factor; and
verifying, by the authentication engine, the at least one ancillary authorization factor, wherein the authorization of authorizing the first device to perform the first action is based further on a successful verification of the at least one ancillary authorization factor.

5. The method of claim 4, wherein the at least one ancillary authorization factor comprises a biometric scan factor.

6. The method of claim 1, further comprising:
selecting, by an optimization engine and based on the current connectivity dataset, at least one device from the one or more devices detected by the first device; and
facilitating, by the communications hardware, a data transfer to a second device via the at least one device.

7. The method of claim 6, wherein the at least one device is selected to be a node of an optimal communication path for the data transfer to the second device.

8. The method of claim 1, wherein comparing the current connectivity dataset with the reference connectivity dataset comprises:
comparing, by the authentication engine, characteristics of the one or more devices indicated in the current connectivity dataset with characteristics of the one or more devices indicated in the reference connectivity dataset.

9. The method of claim 8, wherein the characteristics comprise at least one of:
(i) one or more device identifying characteristics, and
(ii) one or more communication characteristics.

10. The method of claim 9, wherein the one or more device identifying characteristics comprise one or more of an internet protocol (IP) address, a Media Access Control (MAC) address, a network name, and a device type.

11. The method of claim 9, wherein the one or more communication characteristics comprise one or more of packet loss, connection type, bandwidth, latency, jitter, and security.

12. The method of claim 1, further comprising:
causing transmission, by the communications hardware, of a current connectivity dataset request to the first device, wherein the current connectivity dataset is received in response to the current connectivity dataset request.

13. The method of claim 12, wherein the current connectivity dataset request is transmitted as part of a re-challenge authentication procedure for an authenticated session with the first device.

14. An apparatus comprising:
a location modeling engine configured to:
prior to receiving the current connectivity dataset from a first device, generate a reference connectivity dataset based on a plurality of current connectivity datasets received during a plurality of instances by respective devices of a plurality of devices at a first location, wherein the location modeling engine generates the reference connectivity dataset by:
clustering data points representing devices included in the plurality of current connectivity datasets, wherein the devices included in the plurality of current connectivity datasets are devices that are detected by the devices of a plurality of devices to be in communication with the devices at the first location, identifying, based on the clustering, at least a portion of the devices as being representative of the first location, and populating the reference connectivity dataset with the identified devices:
communications hardware configured to:
receive, from the first device, an authorization request associated with a first action, and receive the current connectivity dataset from the first device, wherein the current connectivity dataset indicates one or more devices detected by the first device to be in communication with the first device; and an authentication engine configured to:
compare the current connectivity dataset with the reference connectivity dataset, determine, based on the comparison, whether the current connectivity dataset and the reference connectivity dataset satisfy a predefined similarity threshold, and in an instance in which the current connectivity dataset and the reference connectivity dataset satisfy the predefined similarity threshold:
authorize the first device to perform the first action.

15. The apparatus of claim 14, wherein the authentication engine is further configured to, in an instance in which the current connectivity dataset and the reference connectivity dataset fail to satisfy the predefined similarity threshold:
prevent the first device from performing the first action.

16. The apparatus of claim 14, further comprising an optimization engine configured to select, based on the current connectivity dataset, at least one device from the one or more devices detected by the first device; and
wherein the communications hardware is further configured to facilitate a data transfer to a second device via the at least one device.

17. The apparatus of claim 16, wherein the optimization engine selects the at least one device to be a node of an optimal communication path for the data transfer to the second device.

18. The apparatus of claim 14, wherein the authentication engine compares the current connectivity dataset with the reference connectivity dataset by:
comparing characteristics of the one or more devices indicated in the current connectivity dataset with characteristics of the one or more devices indicated in the reference connectivity dataset.

19. The apparatus of claim 18, wherein the characteristics comprise at least one of:
(i) one or more device identifying characteristics, and
(ii) one or more communication characteristics.

20. A computer program product comprising at least one non-transitory computer-readable storage medium storing software instructions that, when executed, cause an apparatus to:
prior to receiving a current connectivity dataset from a first device, generate a reference connectivity dataset based on a plurality of current connectivity datasets received during a plurality of instances by respective devices of a plurality of devices at a first location, wherein generating the reference connectivity dataset comprises: clustering data points representing devices included in the plurality of current connectivity datasets, wherein the devices included in the plurality of current connectivity datasets are devices that are detected by the devices of a plurality of devices to be in communication with the devices at the first location, identifying, based on the clustering, at least a portion of the devices as being representative of the first location, and populating the reference connectivity dataset with the identified devices:
receive, from the first device, an authorization request associated with a first action;
receive the current connectivity dataset from the first device, wherein the current connectivity dataset indicates one or more devices detected by the first device to be in communication with the first device;
compare the current connectivity dataset with the reference connectivity dataset; determine, based on the comparison, whether the current connectivity dataset and the reference connectivity dataset satisfy a predefined similarity threshold; and
in an instance in which the current connectivity dataset and the reference connectivity dataset satisfy the predefined similarity threshold: authorize the first device to perform the first action.

\* \* \* \* \*